(12) United States Patent
Yoon et al.

(10) Patent No.: US 10,203,724 B2
(45) Date of Patent: Feb. 12, 2019

(54) ELECTRONIC DEVICE, AND FABRICATION METHOD AND APPARATUS FOR MANUFACTURING EXTERIOR MEMBER OF THE SAME

(71) Applicant: Samsung Electronics Co., Ltd., Gyeonggi-do (KR)

(72) Inventors: Byoung-Uk Yoon, Hwaseong-si (KR); Min-Su Chang, Seoul (KR); Soon-Ho Han, Hwaseong-si (KR); Jong-Chul Choi, Suwon-si (KR); Jeong-Hoon Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 15/160,481

(22) Filed: May 20, 2016

(65) Prior Publication Data

US 2016/0339679 A1 Nov. 24, 2016

(30) Foreign Application Priority Data

May 21, 2015 (KR) .................. 10-2015-0071188

(51) Int. Cl.

| G06F 1/16 | (2006.01) |
|---|---|
| H05K 5/00 | (2006.01) |
| H05K 7/00 | (2006.01) |
| B32B 38/18 | (2006.01) |
| B32B 37/10 | (2006.01) |
| B32B 38/10 | (2006.01) |

(52) U.S. Cl.
CPC ........ *G06F 1/1633* (2013.01); *B32B 38/1866* (2013.01); *B32B 37/10* (2013.01); *B32B 38/10* (2013.01); *B32B 38/1833* (2013.01); *B32B 2037/1072* (2013.01); *B32B 2310/0843* (2013.01); *B32B 2398/10* (2013.01); *B32B 2457/00* (2013.01); *G06F 2200/1633* (2013.01)

(58) Field of Classification Search
CPC .... G06F 1/1633; G06F 1/1656; G06F 1/1675; G06F 1/1637; G06F 1/1601; G06F 1/1613; G06F 1/16; B32B 38/1866; B32B 38/1833; B32B 38/10
USPC .............. 361/679.55, 679.56, 679.21–679.3, 361/679.01, 679.02
See application file for complete search history.

(56) References Cited

U.S. PATENT DOCUMENTS

| 8,199,488 B2 * | 6/2012 | Zou .......................... B32B 3/02 312/223.1 |
|---|---|---|
| 8,638,549 B2 * | 1/2014 | Garelli .................. G06F 1/1615 361/679.26 |
| 8,808,483 B2 * | 8/2014 | Sung ................ B32B 17/10036 156/214 |

(Continued)

FOREIGN PATENT DOCUMENTS

JP 07-021909 1/1995

*Primary Examiner* — Anthony M Haughton

(57) ABSTRACT

According to various embodiments of the present disclosure, there is provided a fabrication method for fabricating an exterior member of an electronic device. The fabrication method may include a film disposing step of disposing a film on an exterior member in which one face is formed as a first curved face, and a lamination step of laminating the film on the exterior member. The fabrication method as described above may be variously implemented according to embodiments.

6 Claims, 23 Drawing Sheets

(56) References Cited

U.S. PATENT DOCUMENTS 9,684,333 B2 * 6/2017 Han .................... G06F 1/1613
2009/0277578 A1 11/2009 Sung et al.

* cited by examiner

ELECTRONIC DEVICE, AND FABRICATION METHOD AND APPARATUS FOR MANUFACTURING EXTERIOR MEMBER OF THE SAME

CROSS-REFERENCE TO RELATED APPLICATION(S) AND CLAIM OF PRIORITY

The present application is related to and claims benefit under 35 U.S.C. § 119(a) to Korean Application Serial No. 10-2015-0071188, which was filed in the Korean Intellectual Property Office on May 21, 2015, the entire content of which is hereby incorporated by reference.

TECHNICAL FIELD

Various embodiments of the present disclosure relate to an electronic device include an exterior member, and a fabrication method and apparatus for fabricating the exterior member of the electronic device.

BACKGROUND

An electronic device refers to a device that performs a specific function according to an equipped program, such as an electronic scheduler, a portable multimedia reproducer, a mobile communication terminal, a tablet personal computer (PC), an image/sound device, a desktop/laptop PC, or a vehicular navigation system (such as global position system (GPS)), as well as a home appliance. For example, such an electronic device may output information stored therein as sound or an image. In addition, the electronic device may provide a super-high speed based on a degree of integration of the electronic device. Furthermore, a large capacity wireless communication system has become popular to support various functions that have recently been equipped in a mobile communication terminal (such as a portable electronic device). For example, functions, such as an entertainment function (such as a game function), a multimedia function (such as a music/video reproducing function), a communication and security function for mobile banking, a schedule management function, and an e-wallet function, are integrated in the portable electronic device.

The portable electronic devices supporting various functions or applications (such as an electronic scheduler, a portable multimedia reproducer, a mobile communication terminal, and a tablet PC) have been generally equipped with a display device and a battery in a bar-type, a folder-type, or a sliding-type exterior appearance. Recently, the portable electronic devices have been miniaturized to be wearable on a portion of a body (such as a wrist or a head) and become commercially available.

SUMMARY

To address the above-discussed deficiencies, it is a primary object to satisfy various users' desires by differentiating the exterior appearance of an electronic device from those of other products by improving the exterior appearance of the electronic device. The exterior member of such an electronic device is made of a plastic or a metal that can be easily processed. In addition, in order to make the exterior appearance of the electronic device look classy, the exterior member of the electronic device may be made of glass. The exterior member made of glass may be configured as a housing of the electronic device or a portion of the housing. By attaching a film, on which a motif is formed, to the glass-made exterior member, it is possible to conceal the inside of the electronic device, or to provide various ornament effects to the exterior member of the electronic device.

However, when a film is attached to a glass-made exterior member that has a three-dimensional shape, a portion of the film may finely protrude to the outside of the exterior member. Such a protruding portion of the film may be easily visible to the user, thereby degrading the quality of the exterior appearance. In addition, when a portion of the film protrudes to a side of the exterior member that has a three-dimensional shape, a portion of the exterior member may not be covered by the film. In addition, the film may not be completely closely attached to an end of the exterior member that has a three-dimensional shape, or a phenomenon of pushing out an adhesive to the outside may occur between the exterior member and the film.

Accordingly, various embodiments of the present disclosure are to provide a fabrication method and apparatus for fabricating an exterior member of an electronic device, in which the degradation of the exterior member quality can be prevented in the process of attaching a film to the exterior member that has a three-dimensional shape.

In addition, various embodiments of the present disclosure of the present disclosure are to provide an electronic device in which the exterior appearance can be easily diversified.

According to various embodiments of the present disclosure, there is provided a fabrication method for fabricating an exterior member of an electronic device. The fabrication method may include a film disposing step of disposing a film on an exterior member in which one face is formed in a first curved face, and a lamination step of laminating the film on the exterior member.

The fabrication method for fabricating an exterior member of an electronic device, according to various embodiments of the present disclosure, can prevent the degradation of the exterior member quality, which may be caused in the process of laminating by, for example, preventing a portion of the film from getting out of the exterior member.

Before undertaking the DETAILED DESCRIPTION below, it may be advantageous to set forth definitions of certain words and phrases used throughout this patent document: the terms "include" and "comprise," as well as derivatives thereof mean inclusion without limitation; the term "or," is inclusive, meaning and/or; the phrases "associated with" and "associated therewith," as well as derivatives thereof may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
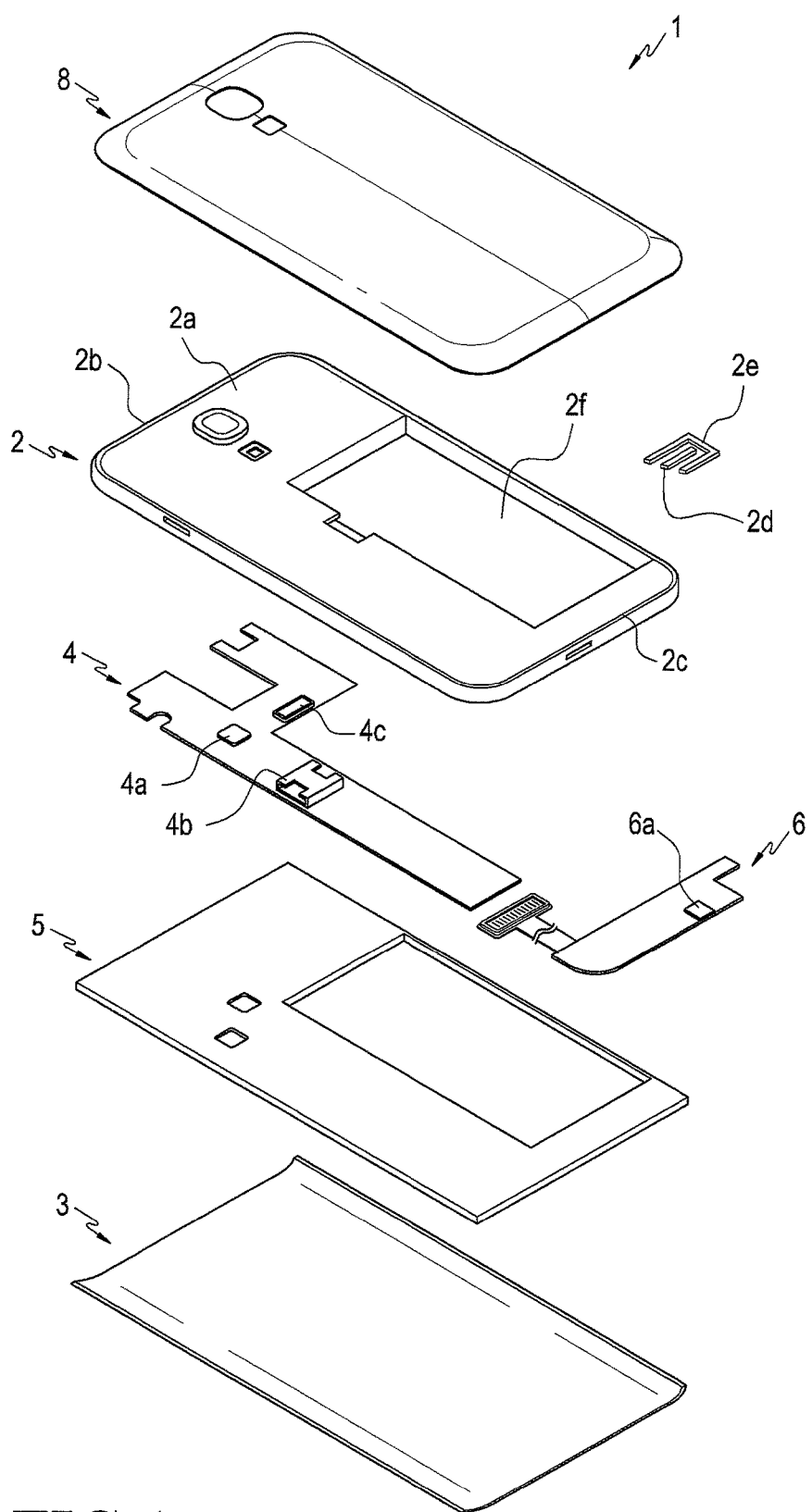
FIG. 1 is an exploded perspective view illustrating an electronic device according to various embodiments of the present disclosure.

FIGS. 1 through 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include a touch panel, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a TV, a display, a heads-up display for a vehicle, a notebook computer, a laptop computer, a tablet personal computer (PC), a personal media player (PMP), a personal digital assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor to the server through a network. The network may be a mobile or cellular communication network, a local area network (LAN), a wireless local area network (WLAN), a wide area network (WAN), an Internet, a small area network (SAN) or the like, but is not limited thereto.

FIG. 1 is an exploded perspective view illustrating an electronic device according to various embodiments of the present disclosure.

Referring to FIG. 1, according to various embodiments of the present disclosure, an electronic device 1 may include a case member 2*a*, a frame 2*b* that is arranged around one face of the case member 2*a* so as to form a side wall, and an antenna device that uses at least a portion of a case 2, which is formed of the case member 2*a* and the frame 2*b*, as a radiating conductor.

The case 2 has a front-opened shape, in which, for example, the case member 2*a* forms the rear face of the case 2, and the frame 2*b* forms side walls, thereby forming a front-opened accommodation space. The case 2 may be at least partially made of a metal material. In addition, the other portion of the case 2 may be made of a synthetic resin. For example, the case member 2*a* may include a synthetic resin, and a portion or the whole of the frame 2*b* may include a metal material. When the case 2 is made of a combination of the metal material and the synthetic resin, the case 2 may be molded by insert injection molding. For example, when the case member 2*a* is molded by introducing a molten resin into a mold in a state where the frame 2*b*, which is formed of a metal material, is seated in the mold, the frame 2*b* may be joined to the case member 2*a* simultaneously with molding the case member 2*a*, thereby forming the case 2. The metal material portion of the frame 2*b* may constitute a portion of an antenna device of the electronic device 1.

According to various embodiments of the present disclosure, the electronic device 1 may include a front cover 3 that is mounted on the front face of the case 2. The front cover 3 may be formed of a window member, to which a display device is coupled. According to various embodiments, a touch panel is incorporated into the front cover 3 so as to provide a function of an input device. The front cover 3 may be disposed outside the electronic device 1 to be used as an exterior member that at least partially implements an exterior design. While FIG. 1 exemplifies the front cover 3 as an exterior member of the electronic device 1, various embodiments of the present disclosure are not limited thereto. For example, the rear cover 8 may also correspond to one of the exterior members of the electronic device 1.

According to various embodiments of the present disclosure, the electronic device 1 may include one or more of circuit boards 4 and 6 that are accommodated in the case 2. The case 2 may accommodate the circuit boards 4 and 6, on which electronic components (e.g., an integrated circuit chip 4a of for example, an application processor (AP), a communication interface, a memory, an audio, and a power management, a storage medium socket 4b, various sensors and connectors 4c, an antenna device, or an external device connecting connector 6a) are mounted. The various electronic components recited above may be distributed and arranged on the first and second circuit boards 4 and 6, respectively. For example, the integrated circuit chip 4a or the like may be arranged on the first circuit board 4, and a portion of the antenna device, the external device connecting connector 6a, or the like may be arranged on the second circuit board 6. The integrated circuit chip 4a may include at least one of for example, the application processor, the communication interface, and the audio.

Each of the first and second circuit boards 4 and 6 may be fabricated to be suitable for the shape of the space that is provided by the case 2. For example, the case 2 may provide a mounting recess 2f for accommodating a battery, and the first and second circuit boards 4 and 6 may be fabricated in a shape to be suitably arranged around the mounting recess 2f within the case 2.

According to various embodiments of the present disclosure, the electronic device 1 may include a support member 5 that is accommodated in the case 2. The support member 5 may improve the mechanical rigidity of the electronic device 1, and may protect and isolate the various electronic components within the electronic device 1 in relation to each other. For example, various electronic components, such as the integrated circuit chip 4a, are mounted on the first and second circuit boards 4 and 6. When the electronic components directly face and come in contact with the front cover 3, the front cover 3 may be damaged. The support member 5 may be arranged between the first and second circuit boards 4 and 6 and the front cover 3 so as to block the electronic components from coming into direct contact with the front cover 3. In addition, the support member 5 may shield electromagnetic waves that are generated by the above-mentioned electronic components while the electronic components are operated, thereby blocking the electromagnetic waves from influencing the operation of the other electronic components. For example, as the support member 5 is arranged, the front cover 3 may conduct a stable operation without being influenced by the electromagnetic waves that are generated by the other electronic components. In addition, the support member 5 may provide various structures, on which the first and second circuit boards 4 and 6 may be fixedly mounted, and may support the front cover 3 so as to stably maintain the flat shape of the front cover 3.

According to various embodiments of the present disclosure, the electronic device 1 may include a rear cover (e.g., a cover member 8) that is provided to be attachable to/detachable from the rear face of the case 2. In the state where the cover member 8 is separated, the mounting recess 2f is opened so that a user may exchange and use a battery. In addition, among the above-mentioned electronic components, the storage medium socket 2b or the like may be exposed to the rear side of the case 2. The cover member 8 is mounted on the rear side of the case 2 so as to isolate and protect the mounting recess 2f or the storage medium socket 4b from the external environment.

Figure 2:
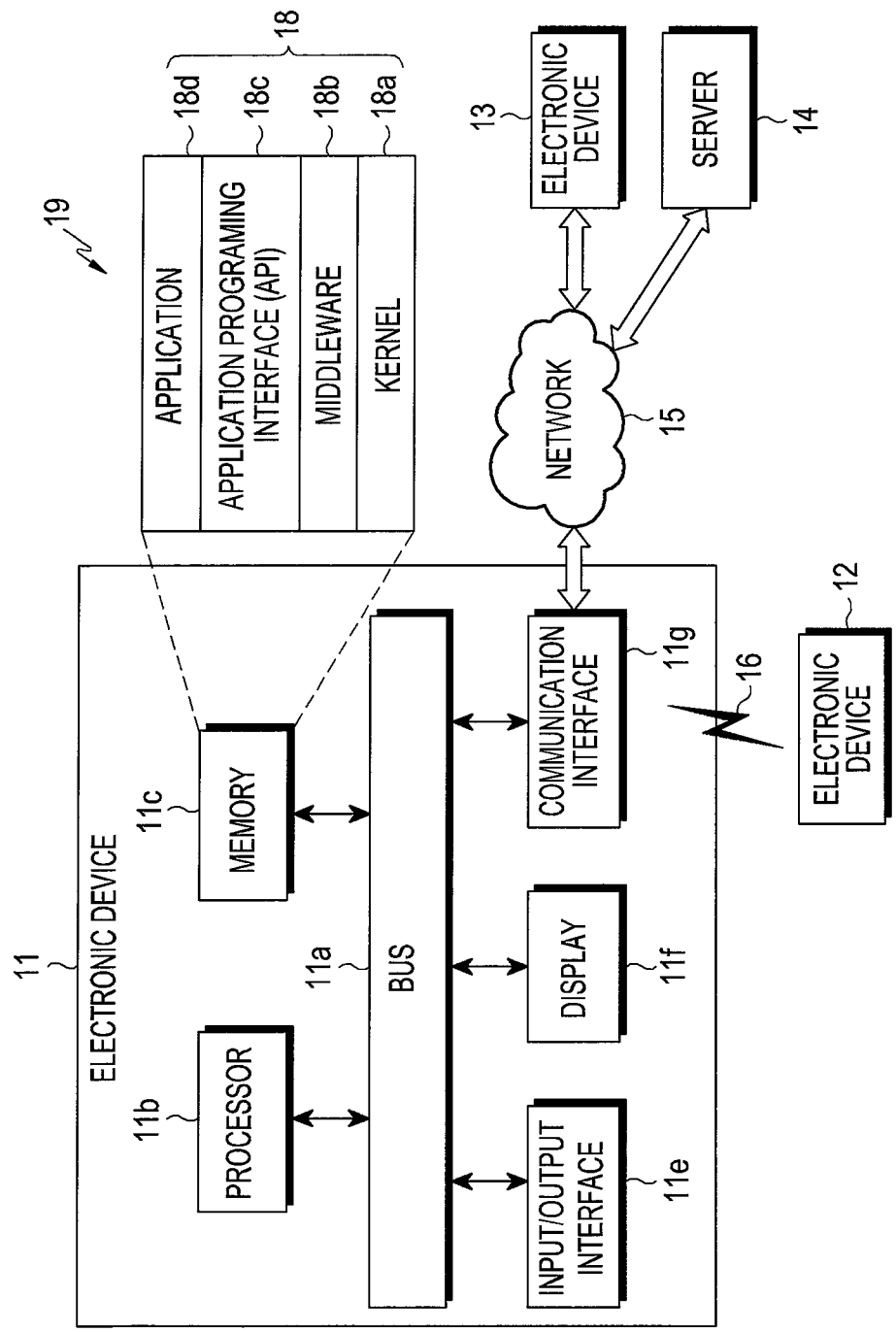
FIG. 2 is a view illustrating a network environment that includes an electronic device according to various embodiments of the present disclosure.

FIG. 2 is a view illustrating a network environment that includes an electronic device according to various embodiments of the present disclosure.

Descriptions will be made on an electronic device 11 (e.g., the above-mentioned electronic device 1) within a network environment 19 in various embodiments with reference to FIG. 2. The electronic device 11 may include a bus 11a, a processor 11b, a memory 11c, an input/output interface 11e, a display 11f, and a communication interface 11g. In a certain embodiment, the electronic device 11 may omit at least one of the above-mentioned components or may additionally include other components.

The bus 11a may include, for example, a circuit that interconnects the above-mentioned components 11b to 11g and transmits communication (e.g., a control message and/or data) between the components.

The processor 11b may include one or more of a central processing unit (CPU), an application processor (AP), and a communication processor (CP). The processor 11b may execute, for example, an arithmetic operation or data processing that is related to a control and/or communication of one or more other components of the electronic device 11.

The memory 11c may include a volatile memory and/or a non-volatile memory. The memory 11c may store, for example, commands or data that are related to one or more other components of the electronic device 11. According to one embodiment, the memory 11c may store software and/or a program 18. The program 18 may include, for example, a kernel 18a, a middleware 18b, an application programming interface (API) 18c, and/or an application program (or an "application") 18d. At least one of the kernel 18a, the middleware 18b, and the API 18c may be referred to as an operating system (OS).

The kernel 18a may control or manage, for example, system resources (e.g., the bus 11a, the processor 11b, or the memory 11c) that are used for executing operations or functions implemented in the other programs (e.g., the middleware 18b, the API 18c, or the application programs 18d). In addition, the kernel 18a may provide an interface that allows the middleware 18b, the API 18c, or the application programs 18d to access individual components of the electronic device 11 so as to control or manage the system resources.

The middleware 18b may play an intermediary role such that, for example, the API 18c or the application programs 18d may communicate with the kernel 18a so as to exchange data.

In addition, the middleware 18b may process one or more task requests which are received from the application programs 18d, according to priority. For example, the middleware 18b may assign the priority to be capable of using a system resource of the electronic device 11 (e.g., the bus 11a, the processor 11b, or the memory 11c) to at least one of the application programs 18d. For example, the middleware 18b may perform scheduling, load balancing, or the like for the one or more task requests by processing the one or more requests according to the assigned priority.

The API 18c is, for example, an interface that allows the applications 18d to control functions provided from the kernel 18a or the middleware 18b, and may include, for example, one or more interfaces or functions (e.g., commands) for a file control, a window control, an image processing, or a character control.

The input/output interface 11e may transmit commands or data, which are entered from, for example, a user or any other external device, to the other component(s) of the electronic device 11. Also, the input/output interface 11e may output commands or data, which are received from the other component(s) of the electronic device 11, to the user or the other external device.

The display 11f may include, for example, a liquid crystal display (LCD), a light emitting diode (LED) display, an organic light emitting diode (OLED) display, or a micro electro mechanical systems (MEMS) display, or an electronic paper display. The display 11I f may display various contents (e.g., text, image, video, icon, or symbol) to, for example, the user. The display 11f may include a touch screen, and may receive a touch input, a gesture input, a proximity input, or a hovering input that is made using, for example, an electronic pen or a part of the user's body.

The communication interface 11g may set, for example, communication between the electronic device 11I and an external device (e.g., a first external electronic device 12, a second external device 13, or a server 14). For example, the communication interface 11g may communicate with the external device (e.g., the second external electronic device 13 or the server 14) by being connected with a network 15 through wired or wireless communication.

The wireless communication may use at least one of for example, long-term evolution (LTE), LTE advance (LTE-A), code division multiple access (CDMA), wideband CDMA (WCDMA), universal mobile telecommunication system (UMTS), wireless broadband (WiBro), or global system for mobile communication (GSM), as a communication protocol. In addition, the wireless communication may include, for example, short range communication 16. The short range communication 16 may include at least one of; for example, wireless fidelity (WiFi), near field communication (NFC), and global navigation satellite system (GNSS). The GNSS may include, for example, at least one of global positioning system (GPS), global navigation satellite system (Glonass), beidou navigation satellite system (hereinafter, "Beidou"), Galileo, and the European global satellite-based navigation system, according to, for example, a use area or band width Hereinafter, in various embodiments of the present disclosure, "GPS" and "GNSS" may be interchangeably used. The wired communication may use at least one of: for example, universal serial bus (USB), high definition multimedia interface (HDMI), recommended standard 232 (RS-232), and plain old telephone service (POTS). The network 15 may include a telecommunication network, for example, at least one of a computer network (e.g., LAN or WAN), the internet, and a telephone network.

Each of the first and second external electronic apparatuses 12 and 13 may be of a type identical to or different from that of the electronic apparatus 11. According to an embodiment, the server 14 may include a group of one or more servers. According to various embodiments, all or some of the operations performed in the electronic device 11 may be performed in another electronic device or a plurality of electronic devices (e.g., the electronic devices 12 and 13 or the server 14). According to an embodiment, when the electronic device 11 has to perform some functions or services automatically or in response to a request, the electronic device 11 may make a request for performing at least some functions relating thereto to another device (e.g., the electronic device 12 or 13 or the server 14) instead of performing the functions or services by itself or in addition. Another electronic apparatus (e.g., the electronic device 12 or 13) or the server 14 may execute the requested functions or the additional functions, and may deliver a result of the execution to the electronic apparatus 11. The electronic device 11 may process the received result as it is or additionally to provide the requested functions or services. To achieve this, for example, cloud computing, distributed computing, or client-server computing technology may be used.

Figure 3:
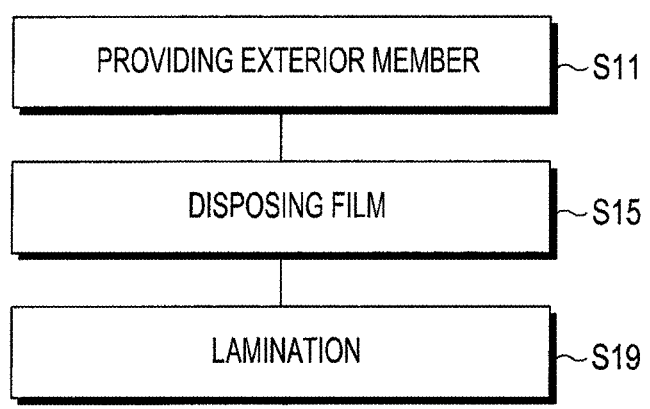
FIG. 3 is a flowchart illustrating a fabrication method for fabricating an exterior member of an electronic device, according to one of various embodiments of the present disclosure.
Figure 4:
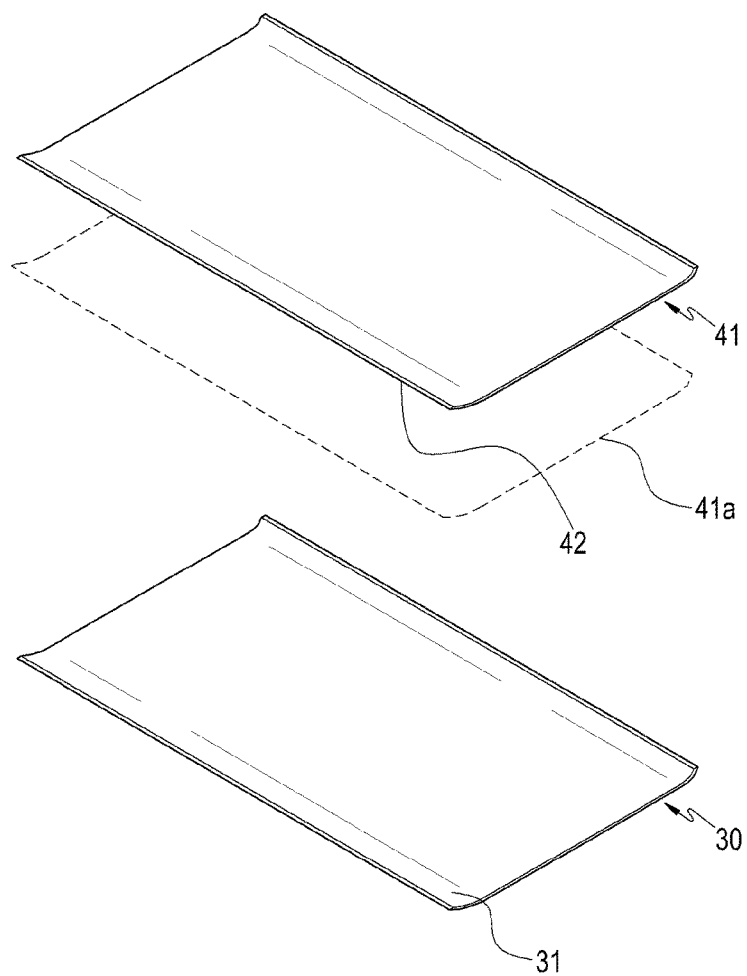
FIG. 4 is a perspective view illustrating the exterior member and a film of an electronic device, according to one of various embodiments of the present disclosure.
Figure 5:
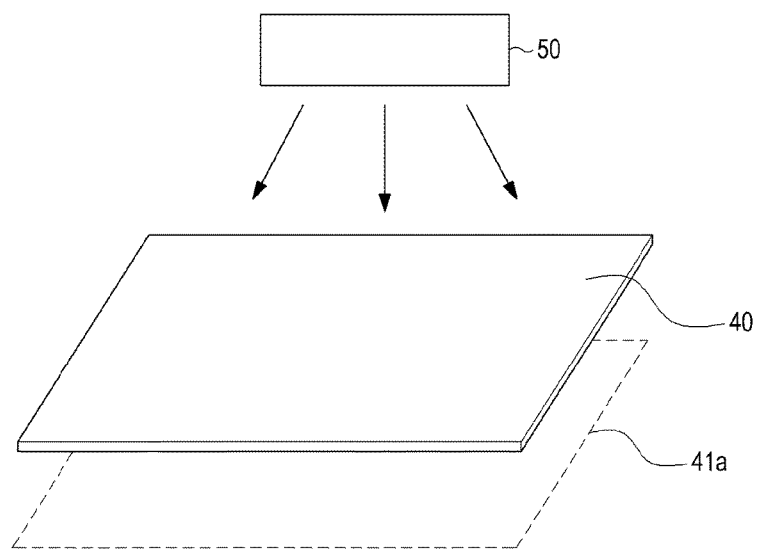
FIG. 5 is a view illustrating method of three-dimensionally fabricating a film of an electronic device, according to one of various embodiments of the present disclosure.

FIG. 3 is a flowchart illustrating a fabrication method for fabricating an exterior member of an electronic device, according to one of various embodiments of the present disclosure. FIG. 4 is a perspective view illustrating the exterior member and a film of an electronic device, according to one of various embodiments of the present disclosure. FIG. 5 is a view illustrating method of three-dimensionally fabricating a film of an electronic device, according to one of various embodiments of the present disclosure.

With reference to FIGS. 3 to 5, descriptions will be made on an exterior member (e.g., the front cover 3 (FIG. 1)) of an electronic device, according to one of various embodiments of the present disclosure, and a fabrication method of the exterior member.

According to one of various embodiments of the present disclosure, a fabrication method for fabricating an exterior member of an electronic device (S10) may include an exterior member providing step (S11), a film disposing step (S15), and a lamination step (S19).

The exterior member providing step (S11) is a step of providing an exterior member 30, in which one face (inner face 31) is at least partially formed in a first curved face. The exterior member 30 may have a three-dimensional shape that is variously curved to be suitable for the exterior shape of the electronic device. For example, at least a portion of the periphery of the exterior member 30 (e.g., the opposite edges) is formed in a curved shape, and the other portion is formed in a flat shape. The exterior member 30 may be made of glass, a transparent ceramic, sapphire, or a plastic. In addition, the exterior member 30 may be made of ceramic materials, which are transparent and have high surface hardness.

In addition, the film 41 may be formed in a three-dimensional shape by having a second curved face 42 that corresponds to the first curved face. Further, the film 41 may be fabricated in a shape that at least partially corresponds to the inner face of the exterior member 30. The film 41 may be formed of a thermosetting resin that is hardened by heat. The film 41 may be three-dimensionally formed by thermal molding to have the second curved face 42. In the thermal molding, a flat film 40 may be provided, the flat film 40 may be bent, and then heat may be applied to the film by using a heater 50. Thereafter, as the heat is cooled, the film 40 may be molded into the film 41 that has a three-dimensional shape, as illustrated in FIG. 4. In addition, the film 41 may be seated on a jig (not illustrated) that has a shape corresponding to the first curved face, and may then be thermally molded by the heater 50 to have the second curved face 42 that corresponds to the first curved face. In addition, according to various embodiments of the present disclosure, the film 41 may be at least partially contracted or expanded by a chemical treatment. That is, the film 41 may have a three-dimensional shape by being contracted or expanded in a region where the film 41 is in contact with a chemical material. In addition, according to various embodiments of the present disclosure, an induction layer 41a, which induces a shape deformation of the flat film 40 or the film 41, may be laminated on the flat film 40 or the film 41. The induction layer 41a may be formed by coating a chemical material containing solution on one side or both sides of the flat film 40 or the film 41, or may be attached to the flat film 40 or the film 41 in the form of a film. The induction layer 41a may be attached to the flat film 40 or the film 41 by including an adhesive. The induction layer 41a may contain a material that is contracted or expanded according to a change in temperature, such as externally applied heat. The induction layer 41a may deform the flat film 40 or the film 41 into a three-dimensional shape by being contracted or expanded according to the change in temperature in the state of being attached to the flat film 40 or the film 41.

The film disposing step (S15) is a step of disposing the film 41 on one face (e.g., the inner face) of the exterior member 30. The film 41 may be disposed to be aligned on the exterior member 30 such that the second curved face 42 of the film 41 corresponds to the first curved face of the exterior member 30.

The lamination step (S19) is a step of laminating the film 41 on the exterior member 30 through a roll laminating method. When there is a sufficient adhesion affinity between the fabricated exterior member 30 and the film 41, the film 41 may be directly laminated on the exterior member 30. For example, when the film 41, which is disposed and aligned on the exterior member 30 is pressed by a roller from one side to the other side of the film 41, the film 41 may be laminated on the inner face of the exterior member 30.

As described above, according to one of various embodiments of the present disclosure, the manufacturing method for fabricating an exterior member of an electronic device (S10) laminates a film 41, which corresponds to an exterior member 30 that has a three-dimensional shape, on the exterior member 30 so that, even if the film 41 disposed on the exterior member 30 is pressed by a roller, it is possible to prevent the position of the film 41 from being changed on the exterior member 30, thereby preventing the film 41 from being poorly adhered at an end of the exterior member 30.

Figure 6:
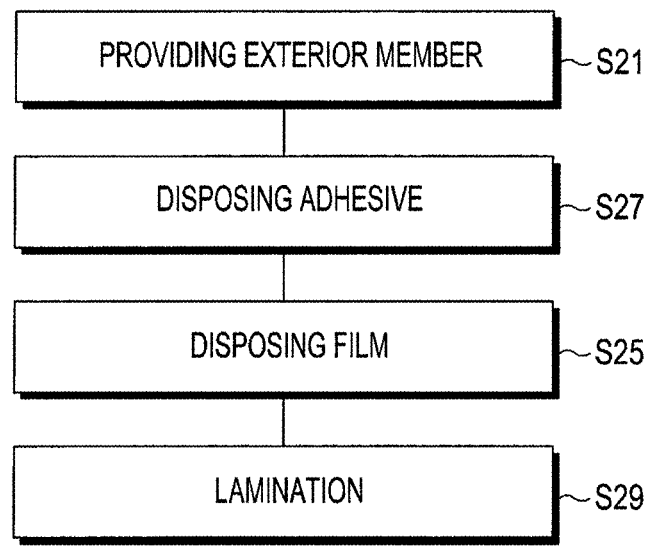
FIG. 6 is a flowchart illustrating a fabrication method for fabricating an exterior member of an electronic device, according to another one of various embodiments of the present disclosure.

FIG. 6 is a flowchart illustrating a fabrication method for fabricating an exterior member of an electronic device, according to another one of various embodiments of the present disclosure.

Referring to FIG. 6, according to one of various embodiments of the present disclosure, a fabrication method for fabricating an exterior member of an electronic device (S20) may include an exterior member providing step (S21), an adhesive disposing step (S27), a film disposing step (S25), and a lamination step (S29). In the present embodiment, descriptions for the components similar to those of the above-described embodiment will be omitted.

In the adhesive disposing step (S27), an adhesive may be interposed between the exterior member and the film such that the film may be attached to the exterior member more rigidly in laminating the exterior member and the film. The adhesive may be an optically clear adhesive (OCA). In addition, the adhesive may be any one selected from a thermosetting adhesive, an ultraviolet-curable adhesive, and a double-sided tape. In addition, the adhesive may become transparent after being cured, so that a motif formed on the film can be seen from the outside of the exterior member.

Figure 7:
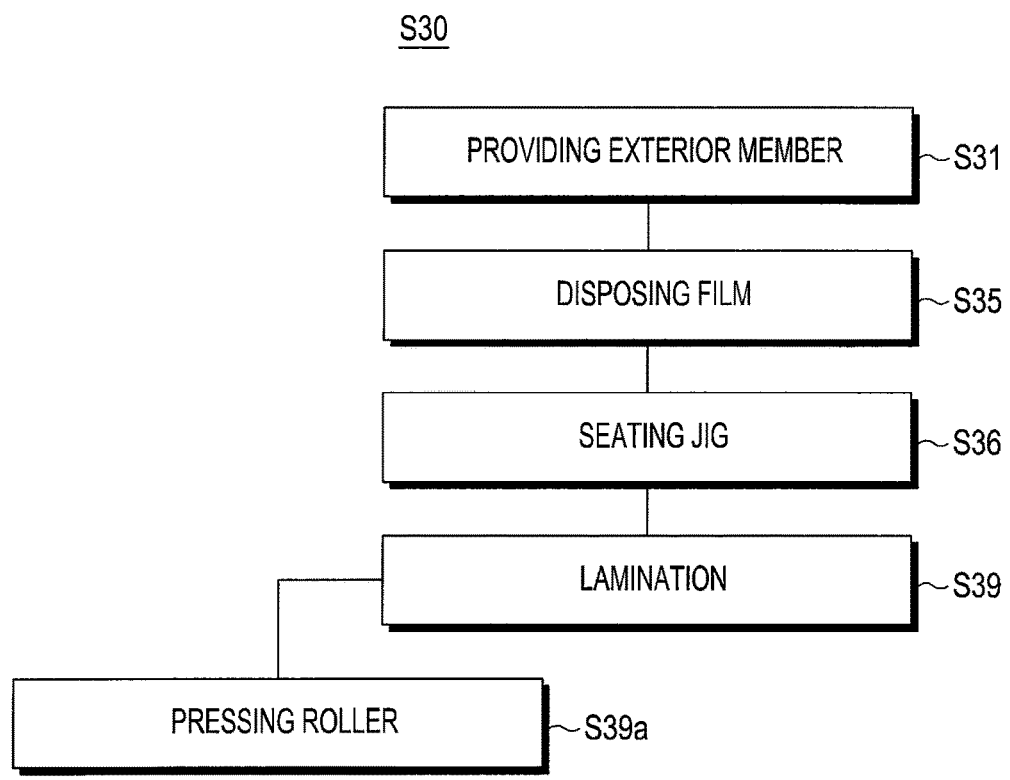
FIG. 7 is a flowchart illustrating a fabrication method for fabricating an exterior member of an electronic device, according to still another one of various embodiments of the present disclosure.
Figure 8:
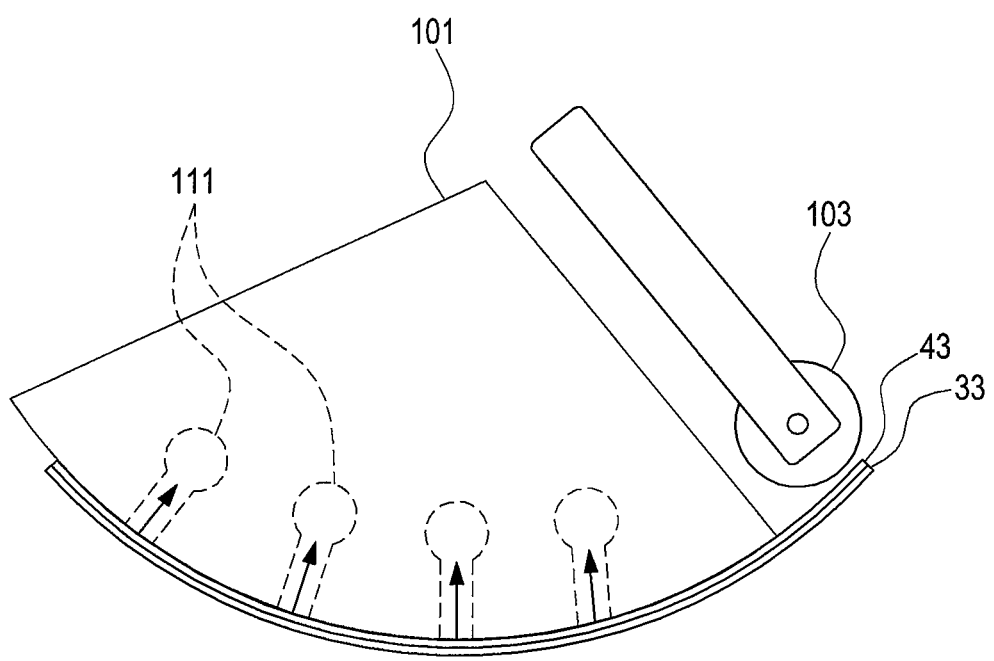
FIG. 8 is a side view illustrating a fabrication apparatus for fabricating an exterior member of an electronic device, according to still another one of various embodiments of the present disclosure.
Figure 9:
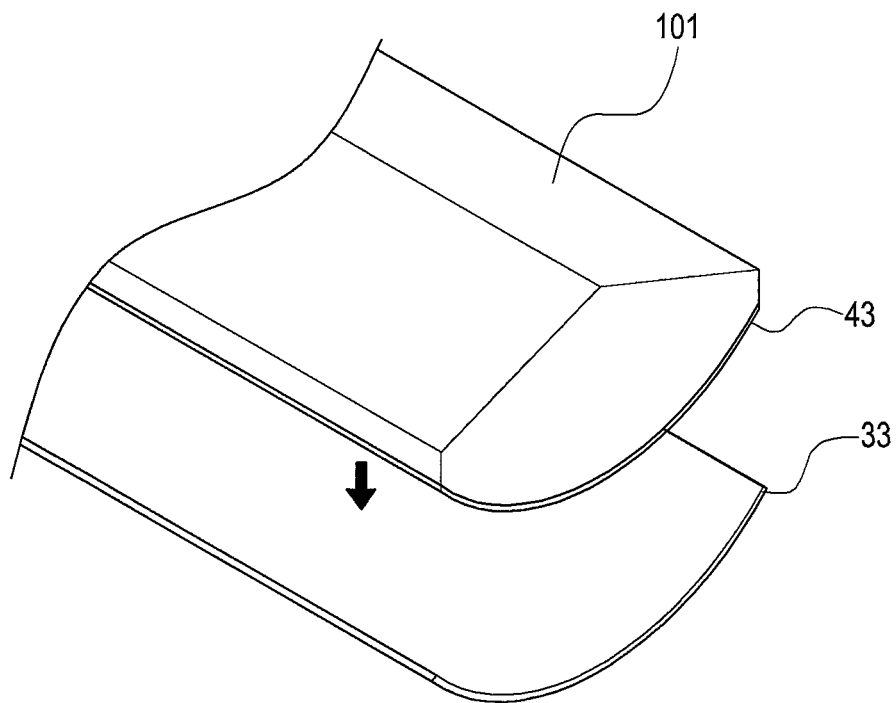
FIG. 9 is a perspective view illustrating a jig of a fabrication apparatus for fabricating an exterior member of an electronic device, according to still another one of various embodiments of the present disclosure.
Figure 10:
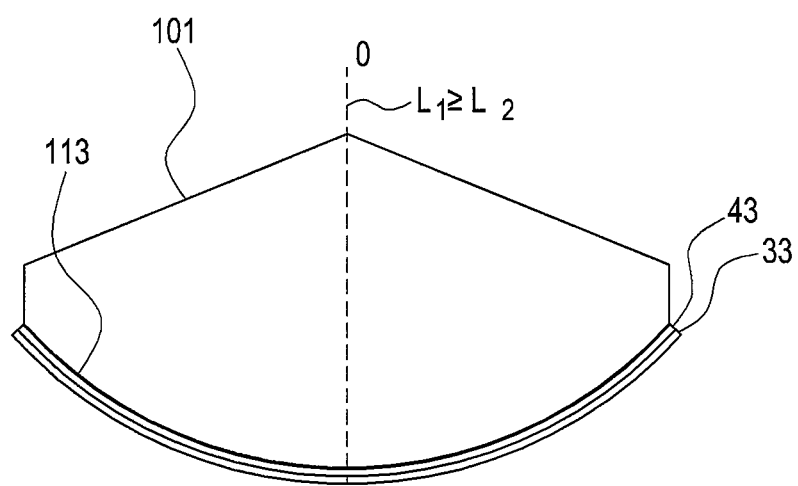
FIG. 10 is a side view illustrating a jig of a fabrication apparatus for fabricating an exterior member of an electronic device, according to still another one of various embodiments of the present disclosure.
Figure 11:
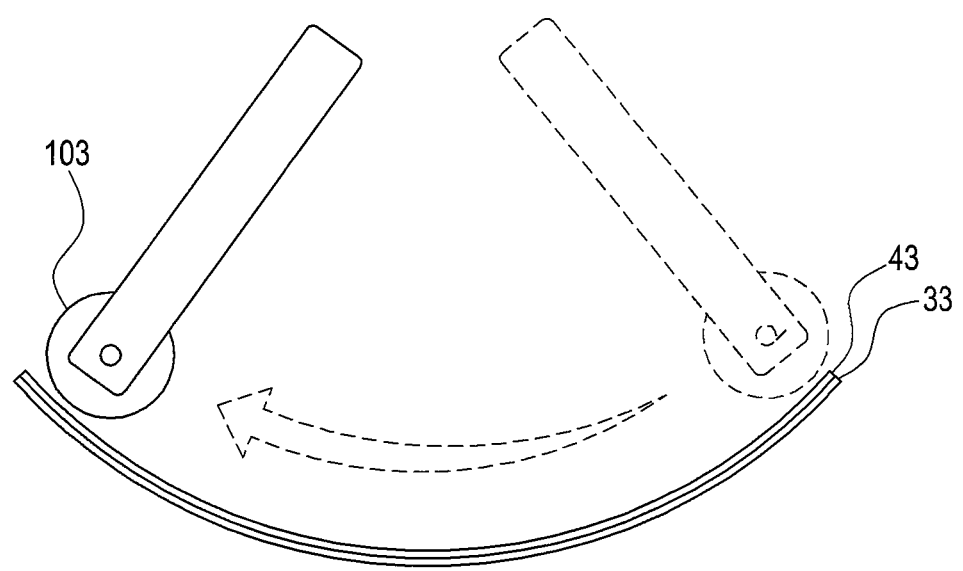
FIG. 11 is a side view illustrating a state in which a roller of a fabrication apparatus for fabricating an exterior member of an electronic device, according to still another one of various embodiments of the present disclosure, is operated.

FIG. 7 is a flowchart illustrating a fabrication method for fabricating an exterior member of an electronic device, according to still another one of various embodiments of the present disclosure. FIG. 8 is a side view illustrating a fabrication apparatus for fabricating an exterior member of an electronic device, according to still another one of various embodiments of the present disclosure. FIG. 9 is a perspective view illustrating a jig of a fabrication apparatus for fabricating an exterior member of an electronic device, according to still another one of various embodiments of the present disclosure. FIG. 10 is a side view illustrating a jig of a fabrication apparatus for fabricating an exterior member of an electronic device, according to still another one of various embodiments of the present disclosure. FIG. 11 is a side view illustrating a state in which a roller of a fabrication apparatus for fabricating an exterior member of an electronic device, according to still another one of various embodiments of the present disclosure, is operated.

With reference to FIGS. 7 to 11, a fabrication method and apparatus for fabricating an exterior member of an electronic device according to another one of various embodiments of the present disclosure will be described.

According to another one of various embodiments of the present disclosure, a fabrication method for fabricating an exterior member of an electronic device (S30) may include an exterior member providing step (S31), a film disposing step (S35), and a lamination step (S39). In the present embodiment, descriptions for the components similar to those of the above-described embodiment will be omitted.

The film disposing step (S35) may be performed through a jig seating step (S36) of seating a jig, which holds the film, on the exterior member such that the film is disposed on the exterior member. By using such a jig, the film may be disposed on the exterior member at a more accurate position. Here, the film may be formed to be curved to have a three-dimensional shape, or may be formed to be flat. Even if the film has a flat shape, the film is capable of being deformed into a curved shape that corresponds to the jig or the exterior member in the state where the film is disposed on the jig or the exterior member.

In addition, the lamination step (S39) is capable of uniformly laminating the film on the exterior member through a roller pressing step (S39a) of pressing the film by using a roller that rolls on the film.

In order to perform the fabrication method of an exterior member of an electronic device (S30), according to another one of various embodiments of the present disclosure, a fabrication apparatus for fabricating an exterior member of an electronic device may include an aligner and a laminator.

The aligner may include a jig 101 that holds the film 43 that is seated on the exterior member 33. The jig 101 may include a facing portion 113 that faces the film 43, and a plurality of suction portions 111 that cause the facing portion 113 and the film 43 to be in close contact with each other. The facing portion 113 may have a curvature radius L2 that is the same as the curvature radius L1 of the first curved face of the exterior member 33 such that the facing portion 113 corresponds to the first curved face of the exterior member 33, or may have a curvature radius L2 that is smaller than the curvature radius L1 of the first curved face of the exterior member 33. For example, the facing portion 113 of the jig 101 may be formed to have a third curved face that has a curvature that is equal to or larger than the curvature (e.g., a bent degree) of the first curved face of the exterior member 33. In addition, the suction portions 111 are configured such that some portions of the facing portion 113 are opened and the openings are connected with the inner space of the jig 101. When the suction portions 111 discharge air to a side opposite to the openings, the film 43 is maintained in the state of closing the openings. Accordingly, through the air discharge by the plurality of suctions portions 111, the film 43 is maintained in the state where the film 43 is in close contact state with the facing portion 113 so that the jig 101 can hold the film 43. The jig 101 may adjust the position where the film 43 is seated on the exterior member 33 so as to prevent a portion of the film 43 from getting out of the exterior member 33. In addition, the adhesive may be coated on any one of the film 43 and the exterior member 33. The film 43 held by the jig 101 can be seated on the exterior member 33 through the position adjustment of the jig 101.

The laminator may include a roller 103 that rolls on the film 43 seated on the exterior member 33 so as to press the film 43 on the exterior member 33. The roller 103 may roll from one side of the film 43 to the other side so as to laminate the film 43 and the exterior member 33.

Meanwhile, the aligner is not limited to the jig 101, but may be any of various devices that maintain the state of the film 43 that is fixed to the exterior member 33 by the operation of the laminator. For example, the aligner may include a fastening piece that is inserted into a recess formed in the exterior member 33 and a hole formed on the film 43 to correspond to the recess so as to maintain the film 43 at the fixed state on the exterior member 33 by inserting the fastening piece into the hole and the recess.

Figure 12:
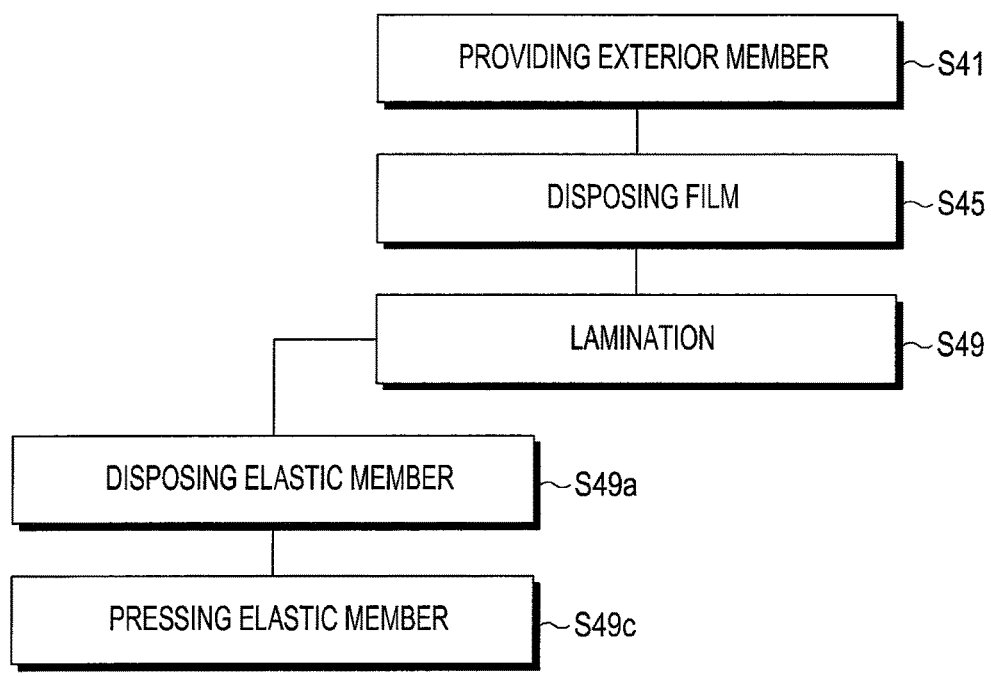
FIG. 12 is a flowchart illustrating a fabrication method for fabricating an exterior member of an electronic device, according to still another one of various embodiments of the present disclosure.
Figure 13:
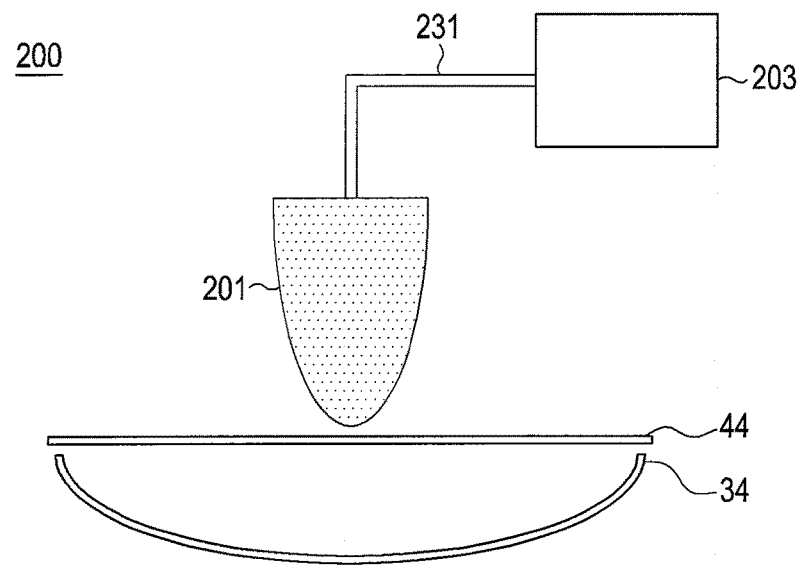
FIG. 13 is a side view illustrating a fabrication apparatus for fabricating an exterior member of an electronic device, according to still another one of various embodiments of the present disclosure.
Figure 14:
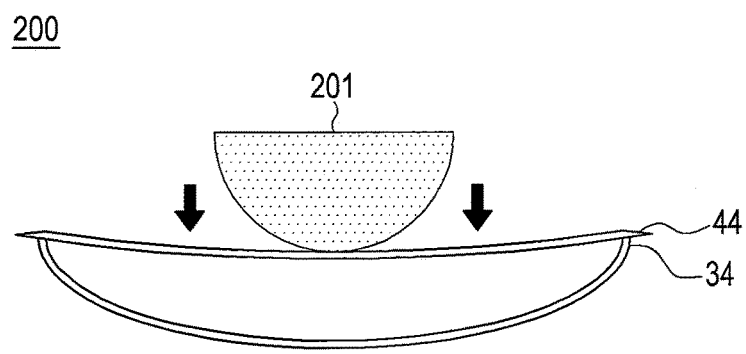
FIGS. 14 and 15 are side views illustrating a state in which a fabrication apparatus for fabricating an exterior member of an electronic device, according to still another one of various embodiments of the present disclosure, is operated.
Figure 15:
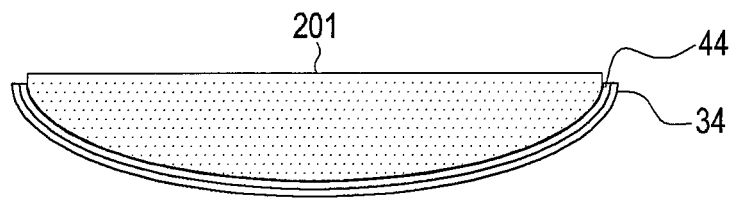

FIG. 12 is a flowchart illustrating a fabrication method for fabricating an exterior member of an electronic device, according to still another one of various embodiments of the present disclosure. FIG. 13 is a side view illustrating a fabrication apparatus for fabricating an exterior member of an electronic device, according to still another one of various embodiments of the present disclosure. FIGS. 14 and 15 are side views illustrating a state in which a fabrication apparatus for fabricating an exterior member of an electronic device, according to still another one of various embodiments of the present disclosure, is operated.

With reference to FIGS. 12 to 15, a fabrication method and apparatus for fabricating an exterior member of an electronic device, according to still another one of various embodiments of the present disclosure, will be described.

According to still another one of various embodiments of the present disclosure, a fabrication method for fabricating an exterior member of an electronic device (S40) may include an exterior member providing step (S41), a film disposing step (S45), and a lamination step (S49). In the present embodiment, descriptions for the components that are similar to those of the above-described embodiment will be omitted.

The lamination step S49 may include an elastic member disposing step (S49a) and an elastic member pressing step (S49c) so as to deform the elastic member 201 into a shape that corresponds to the curved face of the exterior member 34, thereby laminating the film 44 and the exterior member 34. The elastic member disposing step S49a may dispose an elastic member 201, which is inflated by introduction of a fluid, on the film 44. In addition, the elastic member pressing step (S49c) is a step of increasing the volume of the elastic member 201 by introducing the fluid into the elastic member 201. When the elastic member 201 comes into contact with the exterior member 34 according to the increase of volume, the elastic member 201 can be deformed into a shape that corresponds to the exterior member 34 to press the film 44 against the exterior member 34. By the inflation of the elastic member 201, the film 44 may be laminated on the exterior member 34.

In order to perform such a fabrication method for fabricating an exterior member of an electronic device (S40), according to various embodiments of the present disclosure, the laminator 200 may include an elastic member 201 and a fluid supply 203.

The elastic member 201 may be formed of a rubber material, and by the supply of the fluid, the elastic member 201 may be inflated in volume while having the curved face. For example, the elastic member 201 may be inflated in volume in the form of a balloon. However, the elastic member 201 is not limited to the one that is formed of a rubber material, and the elastic member 201 may be formed of any material that is inflatable in volume by being supplied with a fluid.

The fluid supply 203 may supply the fluid into the elastic member 201. The fluid may be air or a liquid. In addition, the fluid supply 203 may include a supply tube 231 that is connected to the elastic member 201 to allow the fluid to flow therein. The supply tube 231 may be formed of a metal-made pipe or a rubber-made hose. The elastic member 201 may be disposed adjacent to the center of the film 44, and is inflatable in volume by being supplied with the fluid from the fluid supply 203. The elastic member 201 can press the film 44 outwardly from the center of the film 44 such that the film 44 can be laminated on the exterior member 34.

In addition, according to various embodiments of the present disclosure, the elastic member 201 is not limited to the one that is inflated in volume by being supplied with the fluid therein, but may be formed of various materials that have elasticity (e.g., sponge) or a combination thereof. When the elastic member, such as sponge, presses the film 44 in the direction where the film 44 comes into contact with the exterior member 34, the shape of the elastic member 201 can be deformed to correspond to the curved face of the exterior member 34 from the time when the film 44 comes into close contact with the exterior member 34 such that the film 44 can be uniformly laminated on the exterior member 34.

Figure 16:
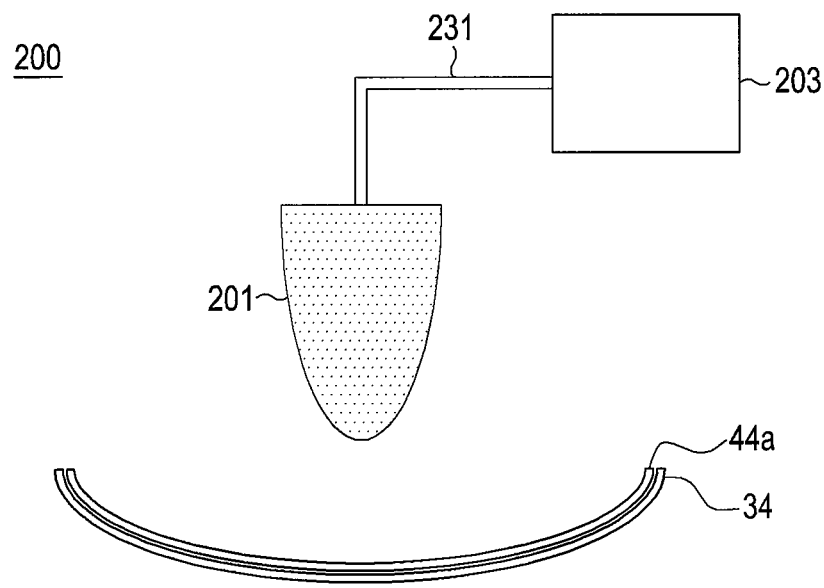
FIG. 16 is a side view illustrating a fabrication apparatus for fabricating an exterior member of an electronic device, according to still another one of various embodiments of the present disclosure.
Figure 17:
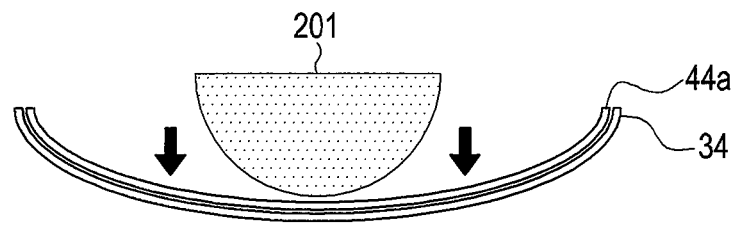
FIGS. 17 and 18 are side views illustrating a state in which a fabrication apparatus for fabricating an exterior member of an electronic device, according to still another one of various embodiments of the present disclosure, is operated.
Figure 18:
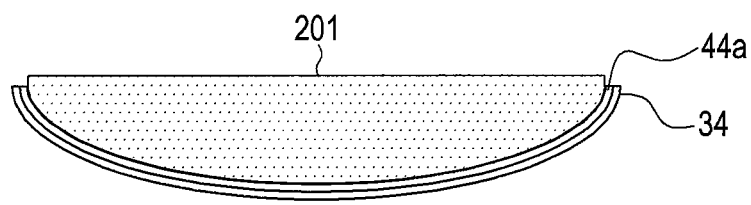

FIG. 16 is a side view illustrating a fabrication apparatus for fabricating an exterior member of an electronic device, according to still another one of various embodiments of the present disclosure. FIGS. 17 and 18 are side views illustrating a state in which a fabrication apparatus for fabricating an exterior member of an electronic device, according to still another one of various embodiments of the present disclosure, is operated.

Referring to FIGS. 16 to 18, a film 44a to be applied to the present embodiment may have a curved face that corresponds to the exterior member 34. The film 44a can be seated on the exterior member 34.

In addition, the elastic member 201 can be supplied with a fluid from the fluid supply 203 to be inflatable on the film 44a. The elastic member 201 can be press the film 44a outwardly from the center of the film 44a so as to laminate the film 44a on the exterior member 34. When the film 44a has a three-dimensional shape that corresponds to the exterior member 34, it is possible to prevent the film 44a from being non-uniformly laminated on the exterior member 34 by being pressed by the elastic member 201, thereby preventing the degradation of the quality of the exterior member.

Figure 19:
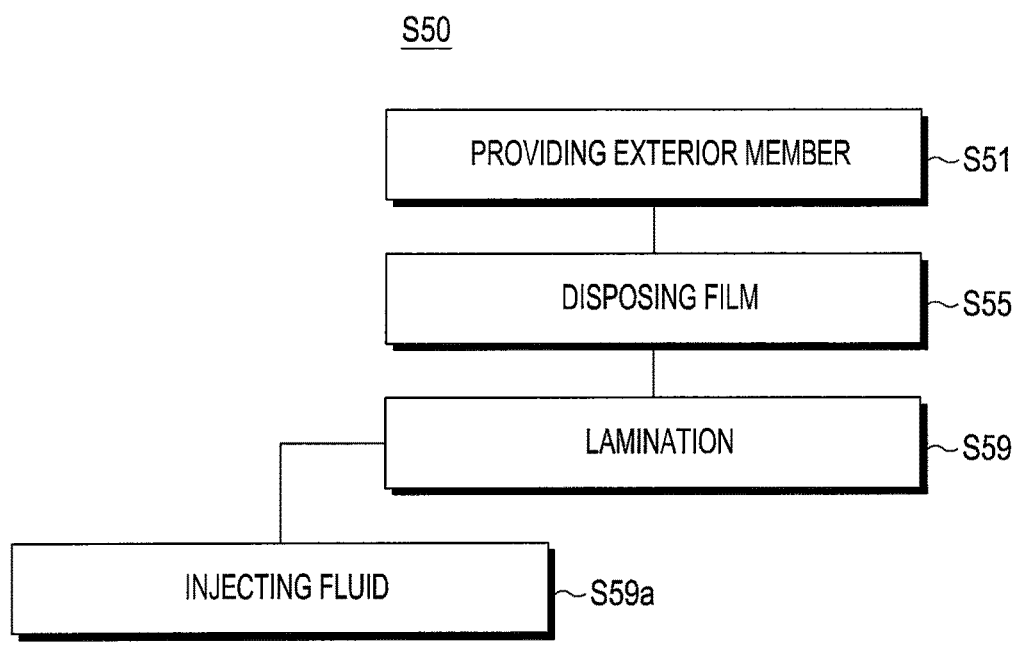
FIG. 19 is a flowchart illustrating a fabrication method for Fabricating an exterior member of an electronic device, according to still another one of various embodiments of the present disclosure.
Figure 20:
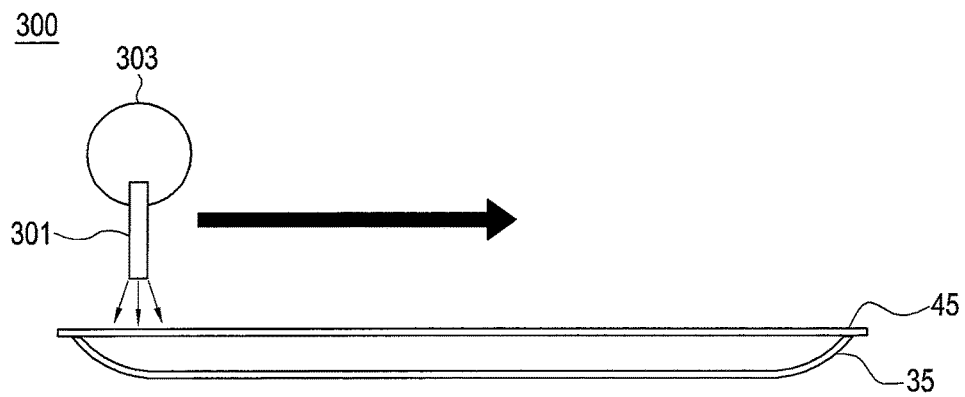
FIG. 20 is a side view illustrating a fabrication apparatus for fabricating an exterior member of an electronic device, according to still another one of various embodiments of the present disclosure.

FIG. 19 is a flowchart illustrating a fabrication method for fabricating an exterior member of an electronic device, according to still another one of various embodiments of the present disclosure. FIG. 20 is a side view illustrating a fabrication apparatus for fabricating an exterior member of an electronic device, according to still another one of various embodiments of the present disclosure.

With reference to FIGS. 19 and 20, a fabrication method and apparatus for fabricating an exterior member of an electronic device, according to still another one of various embodiments of the present disclosure, will be described.

According to still another one of various embodiments of the present disclosure, a fabrication method for fabricating an exterior member of an electronic device (S50) may include an exterior member providing step (S51), a film disposing step (S55), and a lamination step (S59). In the present embodiment, descriptions for the components that are similar to those of the above-described embodiment will be omitted.

The lamination step (S59) is a step that includes a fluid injection step (S59a) of injecting a fluid toward a film 45. The film 45 and the exterior member 35 may be laminated by the force of the injected fluid. The fluid may be air, but may be a gas or a liquid without being limited to air.

In order to perform such a fabrication method for fabricating an exterior member of an electronic device (S50), according to various embodiments of the present disclosure, a laminator 300 may include a fluid injector 301 that injects a fluid toward the film 45 and a fluid supply 303 that supplies the fluid to the fluid injector 301.

The fluid injector 301 injects the fluid toward the film 45 disposed on the exterior member 35 while moving from one side of the film 45 to the other side. However, the fluid injector 301 is not limited to the one that has the structure of moving on the film 45, but may have a structure that changes the position relative to the film 45 as the exterior member 35, on which the film 45 is seated, moves in the state where the fluid injector 301 is fixed. In addition, the fluid supply 303 may transfer the fluid to the fluid injector 301 after pressing the fluid in order to increase the force of the fluid. In addition, the fluid supply 303 may include a pressure adjuster that adjusts the pressure of the fluid so as to adjust the force of the fluid.

The laminator 300, which includes the fluid injector 301 and the fluid supply 303, can press the film 45 against the exterior member 35 by the fluid force (e.g., the force of the fluid to push the film 45) without a separate medium between the film 45 and the fluid so that it is possible to prevent the film 45 from being non-uniformly pressed by a medium. In addition, the laminator 300, which uses the fluid, can prevent the film from being damaged (e.g., dented) by a medium (e.g., a jig)

In addition, in order to laminate a film on an exterior member that has a complicated curved face, the laminator 300, according to various embodiments of the present disclosure, can inject the fluid to the film without a separate medium (e.g., a jig) that corresponds to the complicated curved face so as to press the film against the exterior member.

In addition, according to various embodiments, the laminator may press the film against the exterior member by increasing the pressure at the top side of the film rather than the pressure at the bottom side of the film.

Figure 21:
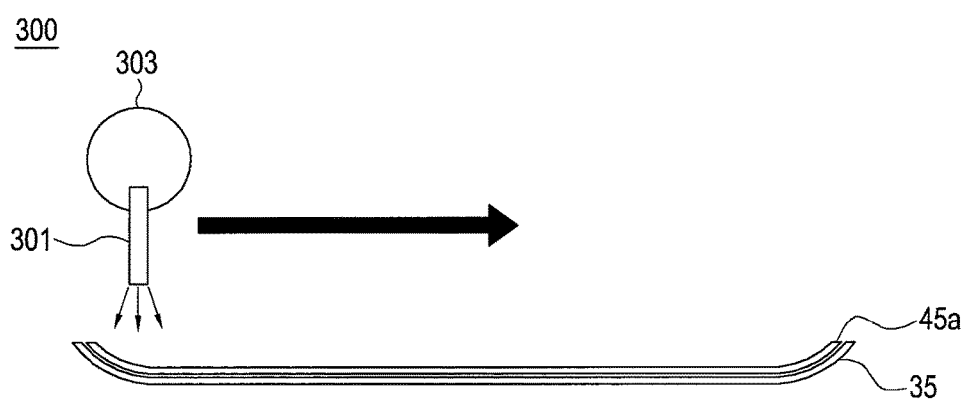
FIG. 21 is a side view illustrating a fabrication apparatus for fabricating an exterior member of an electronic device, according to still another one of various embodiments of the present disclosure.

FIG. 21 is a side view illustrating a fabrication apparatus for fabricating an exterior member of an electronic device, according to still another one of various embodiments of the present disclosure.

Referring to FIG. 21, a film 45a to be applied to various embodiments of the present disclosure may have a three-dimensional shape to correspond to the curved face of the exterior member 35.

When the film 45a is seated on the exterior member 35 and then laminated through the fluid injector 301, it is possible to prevent the film 45a and the exterior member 35 from being non-uniformly laminated.

Figure 22:
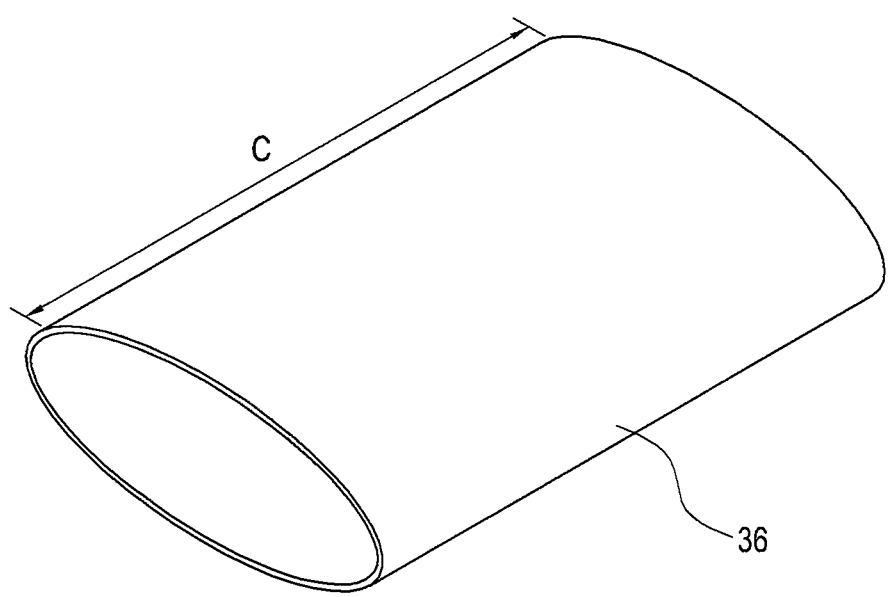
FIG. 22 is a perspective view illustrating an exterior member of an electronic device, according to still another one of various embodiments of the present disclosure.
Figure 23:
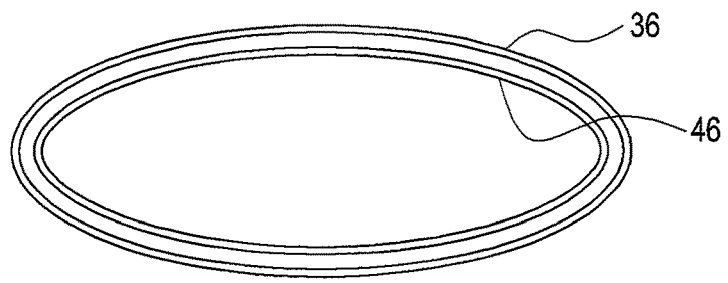
FIG. 23 is a side view illustrating an exterior member and a film of an electronic device, according to still another one of various embodiments of the present disclosure.
Figure 24:
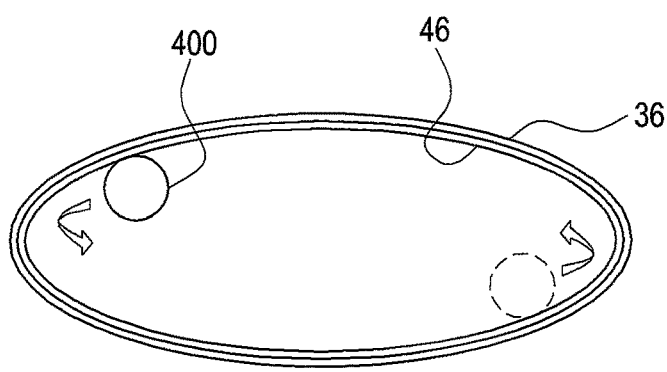
FIG. 24 is a side view illustrating a fabrication apparatus for fabricating an exterior member of an electronic device, according to still another one of various embodiments of the present disclosure.

FIG. 22 is a perspective view illustrating an exterior member of an electronic device, according to still another one of various embodiments of the present disclosure. FIG. 23 is a side view illustrating an exterior member and a film of an electronic device, according to still another one of various embodiments of the present disclosure. FIG. 24 is a side view illustrating a fabrication apparatus for fabricating an exterior member of an electronic device, according to still another one of various embodiments of the present disclosure.

With reference to FIGS. 22 to 24, an exterior member of an electronic device, according to still another one of various embodiments of the present disclosure and a fabrication apparatus of the exterior member, will be described.

According to still another one of various embodiments of the present disclosure, an exterior member 36 of an electronic device may have a cylindrical shape having a length c so as to form the exterior of the electronic device. In addition, a film 46, which is formed with a motif or a pattern, may be laminated on the inner face of the exterior member 36 so that the film 46 can conceal the interior of the electronic device, or can implement an ornamental effect of the exterior member 36. In addition, the film 46 may include a sheet that transmits an input signal by a user's touch.

In order to laminate the film 46 on the exterior member 36, a fabrication apparatus for fabricating an exterior member of an electronic device, according to various embodiments of the present disclosure, may include a roller 400 that has a rod shape longer than the length c of the exterior member 36 and rotates inside the exterior member 36. The roller 400 can press the film 46 against the exterior member 36. In addition, an elastic pad (not illustrated) is provided on the outer face of the roller 400 so that the film 46 can be laminated on an exterior member that has a complicated curved face by the elastic pad.

In addition, the film 46 may be formed in a cylindrical shape to correspond to the inner face of the exterior member 36 so as to prevent the film 46 from being non-uniformly attached to the exterior member 36 in the process of laminating the film 46 and the exterior member 36. In addition, according to various embodiments of the present disclosure, the film 46 is not limited to the one that is formed in the cylindrical shape, but may be formed in a flat shape and may be inserted into the inside of the exterior member 36 in a wound state, thereby being laminated on the exterior member 36.

Figure 25:
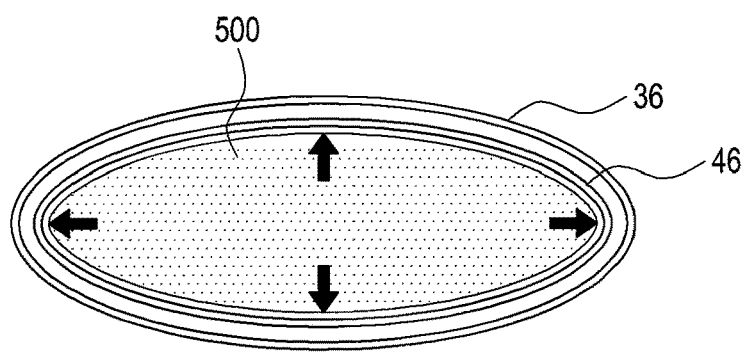
FIG. 25 is a side view illustrating a fabrication apparatus for fabricating an exterior member of an electronic device, according to still another one of various embodiments of the present disclosure.
Figure 26:
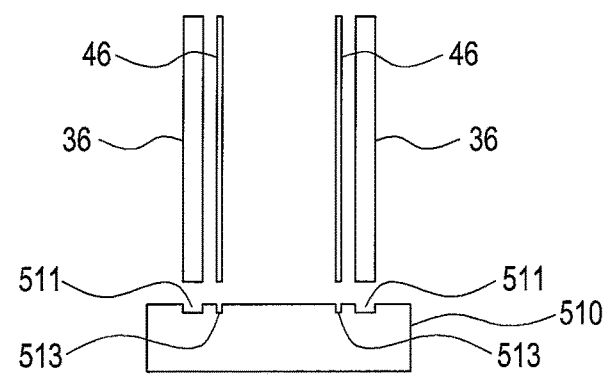
FIG. 26 is a cross-sectional view illustrating a fixing unit that fixes an exterior member and a film of an electronic device, according to still another one of various embodiments of the present disclosure.
Figure 27:
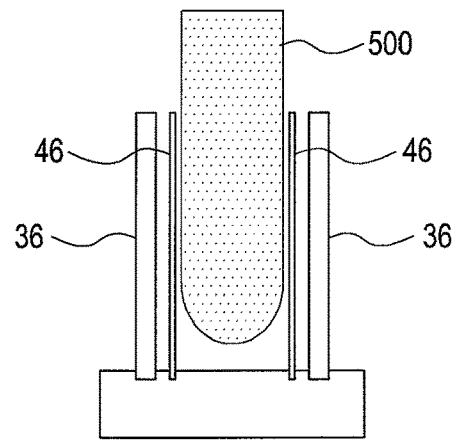
FIGS. 27 and 28 are cross-sectional views illustrating a state in which a fabrication apparatus for fabricating an exterior member of an electronic device, according to still another one of various embodiments of the present disclosure, is operated.
Figure 28:
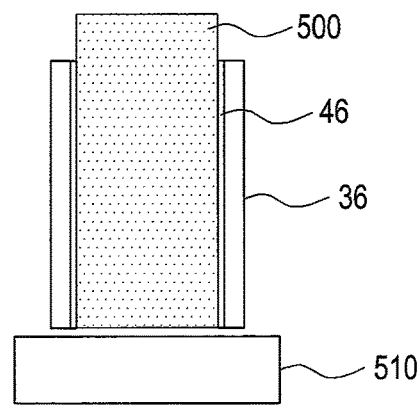
Figure 29:
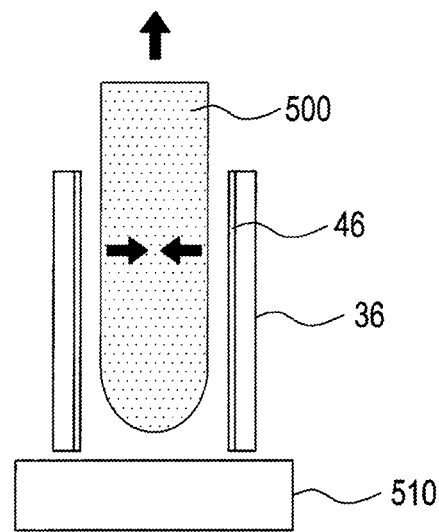
FIG. 29 is a cross-sectional view illustrating a state in which a fabrication apparatus for fabricating an exterior member of an electronic device, according to still another one of various embodiments of the present disclosure, is taken out from the exterior member.

FIG. 25 is a side view illustrating a fabrication apparatus for fabricating an exterior member of an electronic device, according to still another one of various embodiments of the present disclosure. FIG. 26 is a cross-sectional view illustrating a fixing unit that fixes an exterior member and a film of an electronic device, according to still another one of various embodiments of the present disclosure. FIGS. 27 and 28 are cross-sectional views illustrating a state in which a fabrication apparatus for fabricating an exterior member of an electronic device, according to still another one of various embodiments of the present disclosure, is operated. FIG. 29 is a cross-sectional view illustrating a state in which a fabrication apparatus for fabricating an exterior member of an electronic device, according to still another one of various embodiments of the present disclosure, is taken out from the exterior member.

Referring to FIGS. 25 and 29, according to still another one of various embodiments of the present disclosure, a fabrication apparatus for fabricating an exterior member of an electronic device may include a support unit 510 that supports an exterior member 36 and a film 46, each of which has a cylindrical shape, and an elastic member 500 that is inserted into the inside of the exterior member 36 to be inflatable.

The support unit 510 may include a first recess 511, into which one end of the exterior member 36 is inserted, and a second recess 513, into which one end of the film 46 is inserted. The one end of the exterior member 36 of the cylindrical shape may be inserted into the first recess 511 to be maintained in the fixed state, and the one end of the film 46 is inserted into the second recess 513 to maintain the cylindrical shape.

The elastic member 500 is inserted into the inside of the cylindrical film 46 and is inflatable by being supplied with a fluid. Since the operating principle of the elastic member 500 is similar to that in the above-described embodiments, detailed descriptions thereof will be omitted. The elastic member 500 can press the film 46 against the exterior member 36 by being inflated in volume. At this time, since the film 46 is formed of a flexible material, the film 46 is stretched by being inflated by the elastic member 500 to be laminated on the exterior member 36. In addition, after the film 46 is laminated on the exterior member 36, the elastic member 500 can be released from the film 46 when the fluid within the elastic member 500 is discharged and the elastic member 500 is contracted. The elastic member 500 can be taken out to the outside of the exterior member 36.

In addition, according to various embodiments of the present disclosure, the elastic member 500 is not limited to the one that is inflated in volume by being supplied with the fluid, but may be formed of various materials that have elasticity (e.g., a sponge) or a combination thereof. When the elastic member, such as a sponge, presses the film 46 in the direction where the film 46 comes into contact with the exterior member 36, the shape of the elastic member 500 can be deformed to correspond to the curved face of the exterior member 36 from the time when the film 46 comes into close contact with the exterior member 36 such that the film 46 can be uniformly laminated on the exterior member 36.

Figure 30:
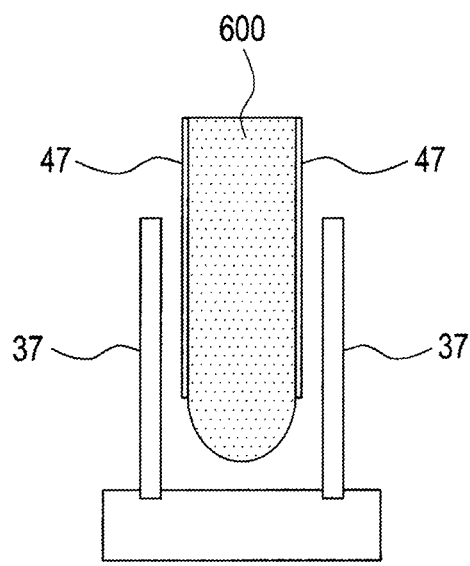
FIG. 30 is a cross-sectional view illustrating a fabrication apparatus for fabricating an exterior member of an electronic device, according to still another one of various embodiments of the present disclosure.
Figure 31:
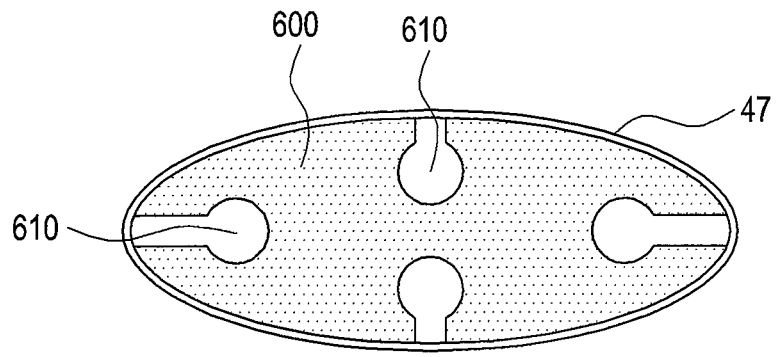
FIG. 31 is a side view illustrating a fabrication apparatus for fabricating an exterior member of an electronic device, according to still another one of various embodiments of the present disclosure.

FIG. 30 is a cross-sectional view illustrating a fabrication apparatus for fabricating an exterior member of an electronic device, according to still another one of various embodiments of the present disclosure. FIG. 31 is a side view illustrating a fabrication apparatus for fabricating an exterior member of an electronic device, according to still another one of various embodiments of the present disclosure.

Referring to FIGS. 30 and 31, according to still another one of various embodiments of the present disclosure, a fabrication apparatus for fabricating an exterior member of an electronic device may be a jig 600 that is inserted into the inside of the cylindrical exterior member 37 in the state of holding a film 46 on the outer face thereof such that the film 47 can be laminated on the inner face of the exterior member 37.

The jig 600 may be formed in a cylindrical shape and may include a plurality of suction portions 610 to hold the film 47 on the outer face thereof. Since the operating principle of the suction portions 610 is similar to that in the above-described embodiments, detailed descriptions thereof will be omitted. The suction portions 610 are adapted to hold the film 47 by discharging air so that the film 47 can be maintained in the state where the film 47 is in close contact with the outer face of the jig 600. In addition, the film 47 may be wound around the outer face of the jig 600 in a first direction. After the film 47 wound around the jig 600 is inserted into the inside of the exterior member 37 together with the jig 600, the film 47 can be pressed against the inner wall of the exterior member 37 as the jig 600 comes into close contact with the inner wall of the exterior member 37, or the film 47 can be pressed against or laminated on the exterior member 37 as the jig 600 is pressed against the exterior member 37 while being rotated in a direction opposite to the first direction.

Figure 32:
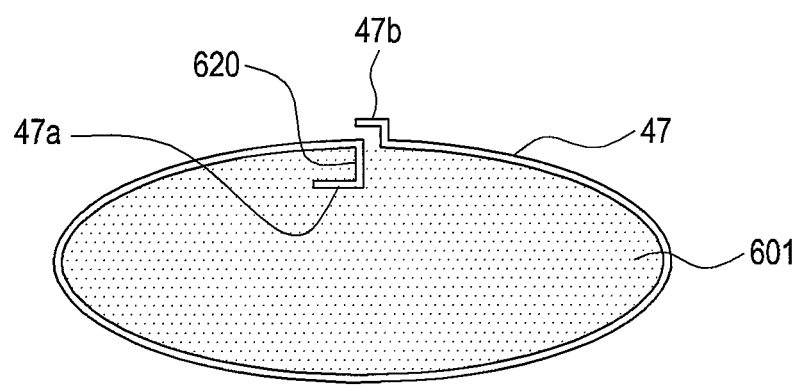
FIG. 32 is a side view illustrating a fabrication apparatus for fabricating an exterior member of an electronic device, according to still another one of various embodiments of the present disclosure.

FIG. 32 is a side view illustrating a fabrication apparatus for fabricating an exterior member of an electronic device, according to still another one of various embodiments of the present disclosure. In the present embodiment, descriptions will be concentrated on a difference between a jig in the present embodiment and the above-described jig.

A jig 601 includes an insertion portion 620 into which one end 47a of the film 47 is inserted. Thus, after the one end 47a of the film 47 is inserted into the insertion portion 620, the film 47 can be wound along the outer face of the jig 601. The jig 601 can be inserted into the inside of the exterior member 37 in the state where the film 47 is wound, so as to laminate the film 47 to the exterior member 37. At this time, the other end 47b of the film 47 is wound to be superimposed on the film 47 so that, in the subsequent lamination step, it is possible to prevent the film 47 from being discontinued on the exterior member 37. In addition, various motifs or patterns may be formed on the film 47 such that it is possible to prevent a masking region for concealing the inside of the exterior member 37 from being discontinued. Further, since the width of a section, in which the film 47 is discontinued in pressing the film 47 against the exterior member 37, can be minimized, it is possible to continuously implement a region for detecting a touch input when the film 47 is implemented as a touch panel.

Figure 33:
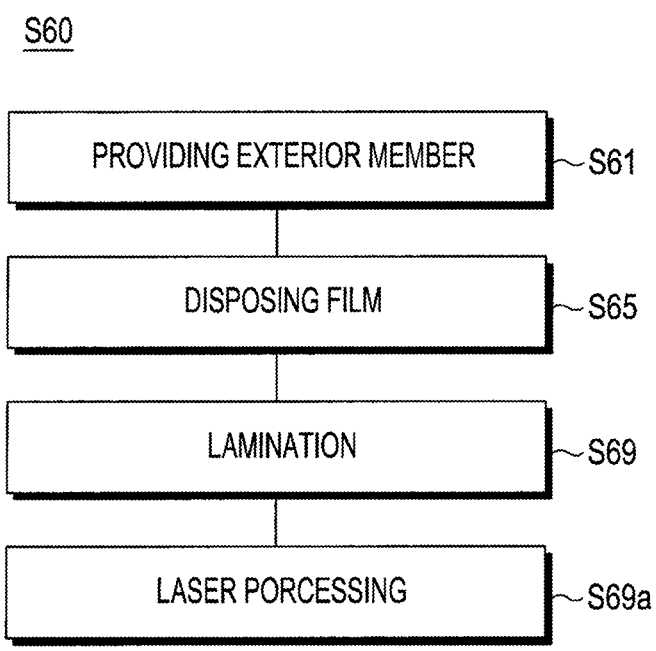
FIG. 33 is a flowchart illustrating a fabrication method for fabricating an exterior member of an electronic device, according to still another one of various embodiments of the present disclosure.
Figure 34:
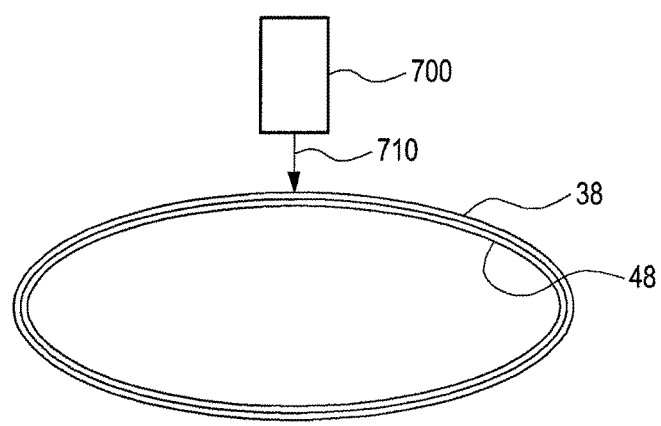
FIG. 34 is a view illustrating a fabrication apparatus for fabricating an exterior member of an electronic device, according to still another one of various embodiments of the present disclosure.
Figure 35:
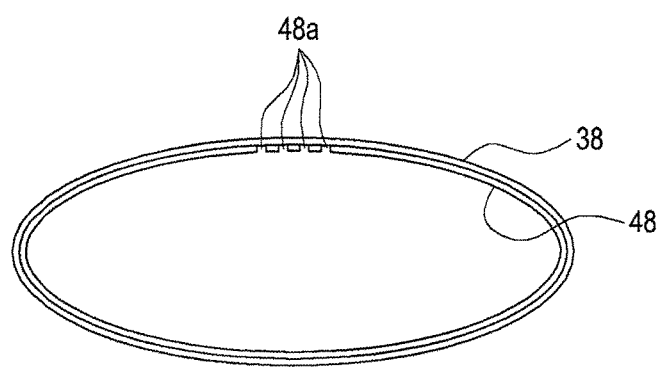
FIG. 35 is a side view illustrating an exterior member and a film of an electronic device, according to still another one of various embodiments of the present disclosure.

FIG. 33 is a flowchart illustrating a fabrication method for fabricating an exterior member of an electronic device, according to still another one of various embodiments of the present disclosure. FIG. 34 is a view illustrating a fabrication apparatus for fabricating an exterior member of an electronic device, according to still another one of various embodiments of the present disclosure. FIG. 35 is a side view illustrating an exterior member and a film of an electronic device, according to still another one of various embodiments of the present disclosure.

With reference to FIGS. 33 to 35, a fabrication method and apparatus for fabricating an exterior member of an electronic device, according to still another one of various embodiments of the present disclosure, will be described.

According to still another one of various embodiments of the present disclosure, a fabrication method for fabricating an exterior member of an electronic device (S60) may include an exterior member providing step (S61), a film disposing step (S65), a lamination step (S69), and a laser processing step S69a. In the present embodiment, descriptions for the components similar to those of the above-described embodiment will be omitted.

The laser processing step (S69a) is a step of processing the film 48 by irradiating a laser beam to the film 48 after the lamination step (S69). In the laser processing step (S69a), a portion of the film 48, which is not in conformity with the exterior member 38, may be removed, and a motif or a pattern may be formed on the film 48.

In order to perform the laser processing step, according to various embodiments of the present disclosure, the fabrication apparatus may further include a laser device 700 to irradiate a laser beam 710. The laser device 700 may remove some portions 48a of the film 48 by irradiating the laser beam 710 to the film 48. The portions 48a of the film, which have been removed by the laser beam 710, may form a pattern or a motif. The laser device 700 may include a frequency adjuster (not illustrated) that adjusts the frequency of the laser beam 710 in order to adjust the intensity of the laser beam 710 that is irradiated to the film 48, by adjusting the frequency of the laser beam 710. The laser device 700 may form various patterns or motifs on the film 48 by adjusting the intensity of the laser beam 710.

As described above, according to various embodiments of the present disclosure, there is provided a fabrication method for fabricating an exterior member of an electronic device. The fabrication method may include a film disposing step of disposing a film on an exterior member in which one face is formed as a first curved face, and a lamination step of laminating the film on the exterior member.

In addition, according to various embodiments of the present disclosure, the film may be formed in a three-dimensional shape that corresponds to the first curved face of the exterior member.

In addition, according to various embodiments of the present disclosure, the film may be formed, through thermal molding, in the three-dimensional shape that corresponds to the first curved face of the exterior member.

In addition, according to various embodiments of the present disclosure, the film may be formed, through a chemical treatment, in the three-dimensional shape that corresponds to the first curved face of the exterior member.

In addition according to various embodiments of the present disclosure, an induction layer may be laminated on one face of the film, and the induction layer may be contracted or expanded according to a change in temperature so as to deform the film into the three-dimensional shape.

In addition, according to various embodiments of the present disclosure, at least one pattern may be formed on the film.

In addition, according to various embodiments of the present disclosure, the lamination step may include a roller pressing step of pressing the film against the exterior member by using a roller that rolls on the film.

In addition, according to various embodiments of the present disclosure, the fabrication method for fabricating an exterior member of an electronic device may further include a jig seating step of seating a jig, which holds the film, on the exterior member, prior to the lamination step.

In addition, according to various embodiments of the present disclosure, the lamination step may include an elastic member disposing step of disposing an inflatable elastic member on the film by introducing a fluid, and an elastic member pressing step of pressing the film against the exterior member by the elastic member by introducing the fluid into the elastic member.

In addition, according to various embodiments of the present disclosure, the lamination step may include an elastic member disposing step of disposing an elastic member that has elasticity, on the film, and an elastic member pressing step of pressing the film against the exterior member by the elastic member.

In addition, according to various embodiments of the present disclosure, the lamination step may include a fluid injection step of injecting a fluid toward the film.

In addition, according to various embodiments of the present disclosure, the fabrication method for fabricating an exterior member of an electronic device may further include a laser processing step of processing the film by irradiating a laser beam to the film.

In addition, according to various embodiments of the present disclosure, the fabrication method for fabricating an exterior member of an electronic device may further include a step of disposing an adhesive between the exterior member and the film; prior to the lamination step.

In addition, according to various embodiments of the present disclosure, there is provided a fabrication apparatus for fabricating the exterior member of an electronic device. The fabrication apparatus may further include an aligner that aligns a film on an exterior member in which one surface is formed as a first curved face, and a laminator that presses the film against the exterior member.

In addition, according to various embodiments of the present disclosure, the aligner may include a jig that holds the film that is seated on the exterior member, and the laminator may include a roller that rolls on the film so as to press the film on the exterior member.

In addition, according to various embodiments of the present disclosure, the jig may be formed to have a third curved face that has a curvature larger than or equal to the curvature of the first curved face.

In addition, according to various embodiments of the present disclosure, the jig may include a facing portion that faces the film, and a plurality of suction portions that cause the facing portion and the film to be in close contact with each other by discharging air.

In addition, according to various embodiments of the present disclosure, the laminator may include an elastic member that is disposed on the film that is seated on the exterior member, and a fluid supply that supplies a fluid to the elastic member, and the elastic member may press the film against the exterior member by being supplied with the fluid to be expanded.

In addition, according to various embodiments of the present disclosure, the laminator may include an elastic member that has elasticity, and as the elastic member presses the film against the exterior member, the film may be laminated on the exterior member.

In addition, according to various embodiments of the present disclosure, the laminator may include a fluid injector that injects a fluid toward the film that is seated on the exterior member, and a fluid supply that supplies a fluid to the fluid injector, and the fluid may press the film against the exterior member.

In addition, according to various embodiments of the present disclosure, there is provided an electronic device. The electronic device may include an exterior member that is disposed outside the electronic device and has one face that is at least partially formed as a first curved face, and a film that is three-dimensionally formed to have a second curved face that corresponds to the first curved face and is at least partially laminated on the one face of the exterior member.

In addition, according to various embodiments of the present disclosure, the exterior member may be formed of at least one of glass, a transparent ceramic, sapphire, and a plastic.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   an exterior member that is disposed outside the electronic device and comprises a face that is at least partially formed as a first curved face;
   a film that is three-dimensionally formed to include a second curved face corresponding to the first curved face, the second curved face being at least partially laminated on the face of the exterior member; and an induction layer laminated on the face of the film, wherein the film is formed with a motif or pattern to conceal at least a portion of an interior of the electronic device or to implement an ornamental effect of the exterior member, and wherein according to a change in temperature, the induction layer contracts or expands, and deforms the film into a three-dimensional shape.

2. The electronic device of claim 1, wherein the exterior member comprises at least one of glass, a transparent ceramic, sapphire, or a plastic.

3. The electronic device of claim 1, wherein the film is formed of a thermosetting resin.

4. The electronic device of claim 1, further comprises an adhesive between the exterior member and the film prior to laminating the film.

5. The electronic device of claim 1, wherein an adhesive is any one selected from an optically clear adhesive (OCA), a thermosetting adhesive, an ultraviolet-curable adhesive, and a double-sided tape.

6. The electronic device of claim 1, wherein the exterior member has a cylindrical shape having a length.

* * * * *